(12) United States Patent
Craig et al.

(10) Patent No.: US 7,555,472 B2
(45) Date of Patent: Jun. 30, 2009

(54) IDENTIFYING CONCEPTUAL GAPS IN A KNOWLEDGE BASE

(75) Inventors: Alan Craig, Peoria, IL (US); Kalev Leetaru, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 126 days.

(21) Appl. No.: 11/218,667

(22) Filed: Sep. 2, 2005

(65) Prior Publication Data

US 2007/0094210 A1  Apr. 26, 2007

(51) Int. Cl.
*G06F 17/00* (2006.01)
*G06N 5/02* (2006.01)

(52) U.S. Cl. .................................................. 706/50
(58) Field of Classification Search ................ None
See application file for complete search history.

(56) References Cited

U.S. PATENT DOCUMENTS

| | | | | |
|---|---|---|---|---|
| 6,076,088 A * | 6/2000 | Paik et al. ................... | 707/5 |
| 7,067,319 B2 * | 6/2006 | Wills et al. .................. | 436/37 |
| 7,080,067 B2 * | 7/2006 | Nonomura et al. ........... | 707/3 |
| 7,085,771 B2 * | 8/2006 | Chung et al. ................ | 707/102 |
| 7,117,216 B2 * | 10/2006 | Chakraborty et al. ....... | 707/100 |
| 7,152,205 B2 * | 12/2006 | Day et al. ................... | 715/239 |
| 7,158,983 B2 * | 1/2007 | Willse et al. ................ | 707/101 |
| 7,165,147 B2 * | 1/2007 | Ting et al. .................. | 711/137 |
| 7,206,778 B2 * | 4/2007 | Bode et al. .................. | 707/5 |
| 7,209,928 B2 * | 4/2007 | Kenyon ...................... | 707/102 |
| 7,219,105 B2 * | 5/2007 | Kummamuru et al. ...... | 707/102 |
| 7,222,298 B2 * | 5/2007 | Monterrosas ............... | 715/205 |
| 7,231,386 B2 * | 6/2007 | Nonomura et al. ........... | 707/3 |
| 7,249,117 B2 * | 7/2007 | Estes .......................... | 706/52 |
| 7,275,059 B2 * | 9/2007 | Stakutis et al. .............. | 707/10 |
| 7,281,206 B2 * | 10/2007 | Schnelle et al. ............. | 715/227 |
| 7,293,018 B2 * | 11/2007 | Hattori et al. ............... | 707/3 |
| 7,305,613 B2 * | 12/2007 | Oezgen ....................... | 715/234 |
| 7,313,758 B2 * | 12/2007 | Kozlov ....................... | 715/234 |

(Continued)

OTHER PUBLICATIONS

A new method for construction filed association terms using co-occurrence words and declinable words information Atlam, E.-S.; Fuketa, M.; Kashiji, S.; Nakata, H.; Aoe, J.; Systems, Man and Cybernetics, 2002 IEEE International Conference on vol. 4, Oct. 6-9, 2002 pp. 5 pp. vol. 4.*

(Continued)

*Primary Examiner*—Michael B Holmes
(74) *Attorney, Agent, or Firm*—Perkins Coie LLP

(57) ABSTRACT

A method and system for augmenting a corpus with documents on concepts not sufficiently covered within the corpus is provided. The augmentation system generates a corpus concept graph from the documents of a corpus. A corpus concept graph represents concepts of the documents as nodes and related concepts as links between nodes. To generate a corpus concept graph, the augmentation system identifies the concepts that are related within each document of the corpus and adds nodes and links to the corpus concept graph for related concepts. The augmentation system analyzes the corpus concept graph to determine whether the relatedness of concepts of the documents of the corpus is sufficient. If the relatedness of a pair of concepts is not sufficient, then the augmentation system attempts to identify documents not already in the corpus that are related to the concepts that are not sufficiently related.

37 Claims, 13 Drawing Sheets

U.S. PATENT DOCUMENTS

| | | | | |
|---|---|---|---|---|
| 7,320,000 | B2* | 1/2008 | Chitrapura et al. | 707/7 |
| 7,337,158 | B2* | 2/2008 | Fratkina et al. | 706/45 |
| 7,340,451 | B2* | 3/2008 | Sacco | 707/3 |
| 7,346,629 | B2* | 3/2008 | Kapur et al. | 707/104.1 |
| 7,370,270 | B2* | 5/2008 | Feng | 715/234 |
| 7,376,620 | B2* | 5/2008 | Kay et al. | 705/40 |
| 7,401,087 | B2* | 7/2008 | Copperman et al. | 707/101 |
| 7,430,261 | B2* | 9/2008 | Forest et al. | 375/364 |

OTHER PUBLICATIONS

Automatic hypertext link generation based on conceptual graphs Gi-Chul Yang; Key-Sun Choi; Document Analysis and Recognition, 1995., Proceedings of the Third International Conference on vol. 2, Aug. 14-16, 1995 pp. 702-705 vol. 2 Digital Object Identifier 10.1109/ICDAR.1995.602000.*

Adlet: an active document abstraction for multimedia information fusion Chang, S.-K.; Znati, T.; Knowledge and Data Engineering, IEEE Transactions on vol. 13, Issue 1, Jan.-Feb. 2001 pp. 112-123 Digital Object Identifier 10.1109/69.908984.*

Extending Tree Automata to Obtain Consistent Query Answer from Inconsistent XML Document Zijing Tan; Wei Wang; Baile Shi; Computer and Computational Sciences, 2006. IMSCCS '06. First International Multi-Symposiums on vol. 2, Jun. 20-24, 2006 pp. 488-495 Digital Object Identifier 10.1109/IMSCCS.2006.223.*

Fusion of multimedia information Chang, S.-K.; Znati, T.; Multi-Media Database Management Systems, 1998. Proceedings. International Workshop on Aug. 5-7, 1998 pp. 2-9 Digital Object Identifier 10.1109/MMDBMS.1998.709470.*

Ontology construction for information selection Khan, L.; Feng Luo; Tools with Artificial Intelligence, 2002. (ICTAI 2002). Proceedings. 14th IEEE International Conference on Nov. 4-6, 2002 pp. 122-127 Digital Object Identifier 10.1109/TAI.2002.1180796.*

Building a concept hierarchy automatically and its measuring Huang-Chenh Kuo; Hung-Chung Lai; Jen-Peng Huang; Machine Learning and Cybernetics, 2008 International Conference on vol. 7, Jul. 12-15, 2008 pp. 3975-3978 Digital Object Identifier 10.1109/ICMLC.2008.4621097.*

Exploiting Structure Recurrence in XML Processing Dong Zhou; Web Engineering, 2008. ICWE '08. Eighth International Conferene on Jul. 14-18, 2008 pp. 311-324 Digital Object Identifer 10.1109/ICWE.2008.46.*

A personalized context-dependent Web search agent using Semantic Trees Yan Chen; Hai Long Hou; Yan-Qing Zhang; Fuzzy Information Processing Society, 2008. NAFIPS 2008. Annual Meeting of the North American May 19-22, 2008, pp. 1-4 Digital Object Identifier 10.1109/NAFIPS.2008.4531347.*

* cited by examiner

IDENTIFYING CONCEPTUAL GAPS IN A KNOWLEDGE BASE

BACKGROUND

Many search engine services allow users to search for information of various data sources. These data sources may be accessible via various communications links such as intranets and the Internet. Web-based search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The search engine service can identify keywords of any particular web page using various well-known information retrieval techniques, such as identifying the words of a headline, the words supplied in the metadata of the web page, the words that are highlighted, and so on. The search engine service then creates an index that maps keywords to web pages.

Although search engine services enable rapid discovery of general information regarding a topic of interest, the search engine services are typically not well suited for in-depth analysis of a topic of interest. When a person wants to explore a topic of interest, that person submits a query containing terms describing the topic of interest. The search engine service uses its index to identify web pages that contain those terms and hopefully relate to the topic of interest. The search engine service returns hyperlinks to the web pages along with a short description of each web page. Unfortunately, the query result typically includes web pages that are not of interest to the person and that are ordered so that the web pages of interest might not even be included on the first few pages of the query result. For example, a person who is interested in understanding "semaphores" may submit the query "operating system semaphores" to a search engine service. Although the query result will likely contain many web pages that relate to operating system semaphores, those web pages will include web pages of universities that list semaphores as a topic in an operating system course, web pages offering to sell books on operating systems, web pages of companies that sell operating systems that use semaphores, web pages of authors who have written papers on semaphores, and so on. It can be difficult for a person to search through the pages of a query result to identify a web page of interest.

To make it easier to search a topic of interest, some organizations have collected, organized, and indexed documents on specific domains. These organizations, for example, may collect documents, such as web pages, journal publications, dissertations, and technical reports, to form a corpus of documents for a specific domain. The organizations may use manual techniques to identify and classify documents that should be included in a domain-specific corpus or may attempt to use automated techniques. A person interested in searching a particular topic selects a corpus for a domain related to the topic and then performs queries on that corpus. The usefulness of such a corpus is based in large part on how comprehensively the corpus covers the topics within the domain. For example, a corpus on operating systems that does not include at least one document relating to semaphores would likely not be useful to a person wanting to study semaphores.

DETAILED DESCRIPTION

Figure 1:
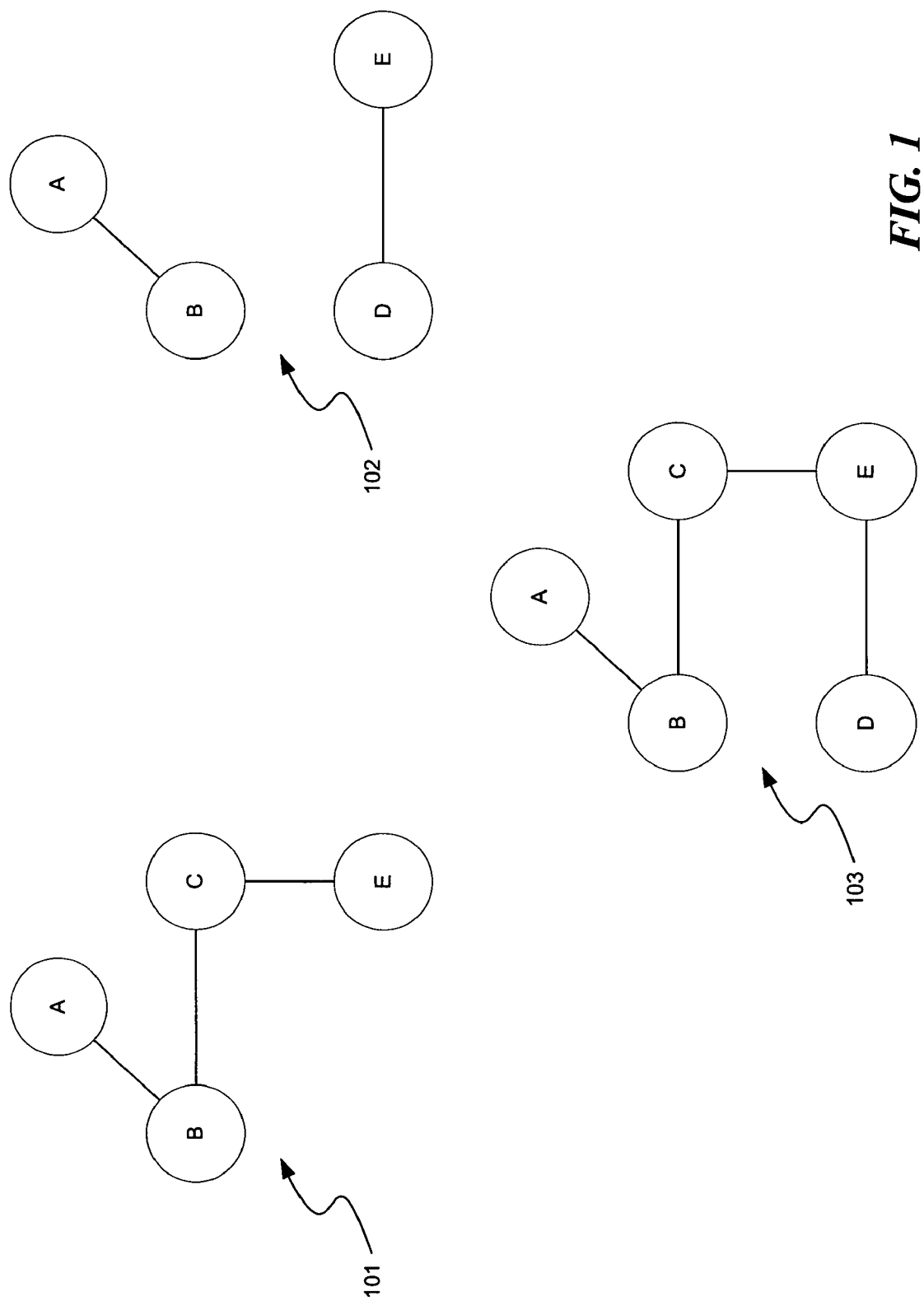
FIG. 1 is a diagram that illustrates the initial creation of a corpus concept graph from document concept graphs.

A method and system for augmenting a corpus with documents on concepts not sufficiently covered within the corpus is provided. In one embodiment, the augmentation system generates a corpus concept graph from the documents of a corpus. A corpus concept graph represents concepts of the documents as nodes and related concepts as links between nodes. For example, a document in the corpus may include a sentence with the terms "semaphore" and "Hoare's monitor." Since each of these terms may be considered a concept, each is represented by a node in the corpus concept graph. Since these concepts occur in the same sentence, the augmentation system may assume that these concepts are related and add a link between the nodes to indicate the relation. To generate a corpus concept graph, the augmentation system identifies the concepts that are related within each document of the corpus and adds nodes and links to the corpus concept graph for related concepts. The augmentation system may also evaluate the "connectedness" of concepts within the corpus. A pair of concepts is directly connected when there is a link or "connection" between the nodes representing the concepts in the corpus concept graph. The connectedness may be evaluated based on the "connection strength" of a connection or the "conceptual distance" between concepts, or both. The connection strength measures how well the corpus covers the relatedness of a pair of concepts. For example, if every document in a corpus of one hundred documents includes the terms "semaphore" and "Hoare's monitor" in a sentence, then the connection strength for those concepts would be high. In contrast, if only one document in that corpus contains those terms in a sentence, then the connection strength for those concepts within the corpus would be low. The conceptual distance between concepts represents the number of connections on a path of the corpus concept graph from one concept to another. For example, the conceptual distance between "semaphore" and "Hoare's monitor" may be 1. If the node representing "semaphore" has a connection to a node representing "critical section," but the node representing "Hoare's monitor" has no connection to the node representing "critical section," then the conceptual distance between "Hoare's monitor" and "critical section" is 2. The augmentation system analyzes the corpus concept graph to determine whether the connectedness of concepts of the documents of the corpus is sufficient. For example, the augmentation system may calculate the connectedness of each pair of concepts as represented by nodes in the corpus concept graph. If the connectedness of a pair of concepts is not sufficient, then the augmentation system attempts to identify documents not already in the corpus that are related to the concepts that are not sufficiently connected. For example, the augmentation system may generate a query that contains words of each concept (e.g., "Hoare's monitor critical section") and submit that query to a search engine service. The augmentation system may add documents identified by the query result to the corpus. In this way, the augmentation system automatically identifies connectedness of concepts within a corpus of documents and adds the documents to the corpus that may improve the connectedness of those concepts.

In one embodiment, the augmentation system may generate a corpus concept graph from document concept graphs. A document concept graph is analogous to a corpus concept graph, except that it pertains to one document rather than a corpus of documents. To generate a document concept graph, the augmentation system identifies related pairs of concepts within a document, adds nodes to the document concept graph for the concepts, adds a connection between the nodes, and assigns a connection strength to the connection. The augmentation system may use various well-known techniques to identify concepts within a document. For example, a concept could be defined as a single non-noise word, a noun phrase generated by a natural language processing system, or a keyword. The augmentation system may use various techniques to determine whether concepts in the document are related. For example, the augmentation system may determine that concepts are related if they are used within the same sentence or within the same paragraph of a document. The augmentation system may calculate connection strength for a pair of related concepts based on the number of words or number of sentences between the concepts within the sentence or paragraph. The connection strength between concepts may vary linearly or non-linearly and may take into consideration the underlying syntax structure of the document (e.g., a pair of concepts in an abstract may have a higher connectedness than a pair of concepts in a background section). The connection strength of a pair of concepts may represent an aggregate of the connection strength of each occurrence in which the concepts are related within the document. For example, if the pair "semaphore" and "Hoare's monitor" are both mentioned in five different paragraphs of a document, then the strength of their connection strength would be greater than if they were both mentioned in only two paragraphs. To generate a corpus concept graph from document concept graphs, the augmentation system may add a node to the corpus concept graph for a concept that is represented by a node in the document concept graph. Alternatively, the augmentation system may only add nodes for a pair of concepts to the corpus concept graph when the connection strength between the nodes satisfies a document connection strength threshold to ensure that concepts that are only tangentially related are not included in the corpus concept graph. If a pair of nodes is connected in multiple document connection graphs, then the augmentation system may set the connection strength for the connection in the corpus concept graph to an aggregate (e.g., average) of the connection strengths in all documents.

In one embodiment, the augmentation system analyzes the corpus concept graph to identify concept gaps within the corpus of documents. A concept gap occurs when two concepts that are in some way related are not sufficiently covered by the documents of the corpus. The augmentation system may assume that pairs of concepts that do not satisfy a connectedness threshold represent a concept gap in the corpus. For example, a concept gap in the corpus may occur if the conceptual distance between a pair of concepts does not satisfy a conceptual distance threshold. If the connectedness threshold is 3, then any pair of concepts with a minimum conceptual distance that is greater than 3 represents a concept gap. The augmentation system attempts to fill in the concept gaps by searching for documents that when added to the corpus would improve the connectedness of the concepts.

In one embodiment, the augmentation system uses a pair of concepts for which there is a concept gap to generate queries for identifying documents that when added to the corpus would improve the connectedness of the pair of concepts. The augmentation system may generate a query based on one of the concepts of the pair and its surrounding concepts. The surrounding concepts may include those concepts that are only a certain conceptual distance (e.g., 1) from the concept of the pair. For example, the augmentation system may submit the query "semaphore critical section" to search for a document that can be used to fill in the gap between "critical section" and "Hoare's monitor." The augmentation system may generate queries based on various combinations of a concept and its surrounding concepts. The augmentation system submits the queries to a search engine service. The augmentation system may add all the documents of the query result to the corpus or may selectively add documents based on whether the connectedness between a pair of concepts would improve. The augmentation system may generate a document concept graph for a document in the query result to determine whether the connectedness would improve. If the augmentation system adds a document to the corpus, it updates the corpus concept graph to include new connections between existing concepts of the corpus or to update the connection strength of an existing connection. The augmentation system may, however, not add any new concepts from the document concept graph to the corpus concept graph to prevent the corpus concept graph from including concepts not originally in the corpus. Alternatively, the augmentation system may add new concepts to expand the boundary of concepts represented by the corpus.

In one embodiment, the augmentation system may use multiple phases of gap identification and corpus augmentation using different connectedness metrics. The augmentation system may initially augment the corpus when the conceptual distance between a pair of concepts is less than a conceptual distance threshold. After the initial augmentation, the augmentation system may augment the corpus when the aggregate connection strength of the connections on the shortest path between a pair of concepts is less than connection strength threshold. The use of aggregate connection strength helps ensure that, even though the conceptual distance between a pair of concepts satisfies the conceptual distance threshold, their connections have sufficient strength to indicate that the documents of the corpus sufficiently cover the relationship between the concepts.

In one embodiment, the principles of the augmentation system may be used to identify gaps in a knowledge base that may represent the knowledge of one person or a group of people. For example, the augmentation system may receive a document that represents the knowledge of a person in a specific domain. The knowledge base may consist of a document that the person was asked to write describing their knowledge of the domain, answers to questions posed to the person to elicit their knowledge, a collection of documents previously authored by the person, and so on. The augmentation system generates a knowledge concept graph from the knowledge base in a manner similar to the generation of the corpus concept graph as described. The augmentation system then analyzes the knowledge concept graph to identify the conceptual gaps within the knowledge base. The conceptual gaps may represent areas where the person needs to study to improve their knowledge. The augmentation system may also generate queries based on the conceptual gaps and suggest the results of the queries as study material to the person. The augmentation system can be used to find conceptual gaps in various types of documents; information sources such as a patent document, an encyclopedia, and so on.

Components of the augmentation system may be useful independently of the augmenting of a corpus. For example, a corpus concept graph may be useful when rating the quality of various corpuses. A corpus concept graph may be generated for each corpus to be rated and an overall score may be generated for each corpus based on the connectedness of certain concepts that may also factor in the number of underlying documents used to determine the connectedness. That is, when comparing the connectedness of concepts between corpuses, the connectedness may consider the quantity of the documents with the connection as well as the quality (or strength) of the connections.

In one embodiment, a corpus concept graph may be used to supplement a query input by a person to a search engine service. The query may be supplemented by surrounding concepts as indicated by the corpus concept graph. Various combinations of the input concept and the surrounding concepts may be submitted as queries to a search engine service. The results can then be combined and provided as a unified query result.

Figure 2:
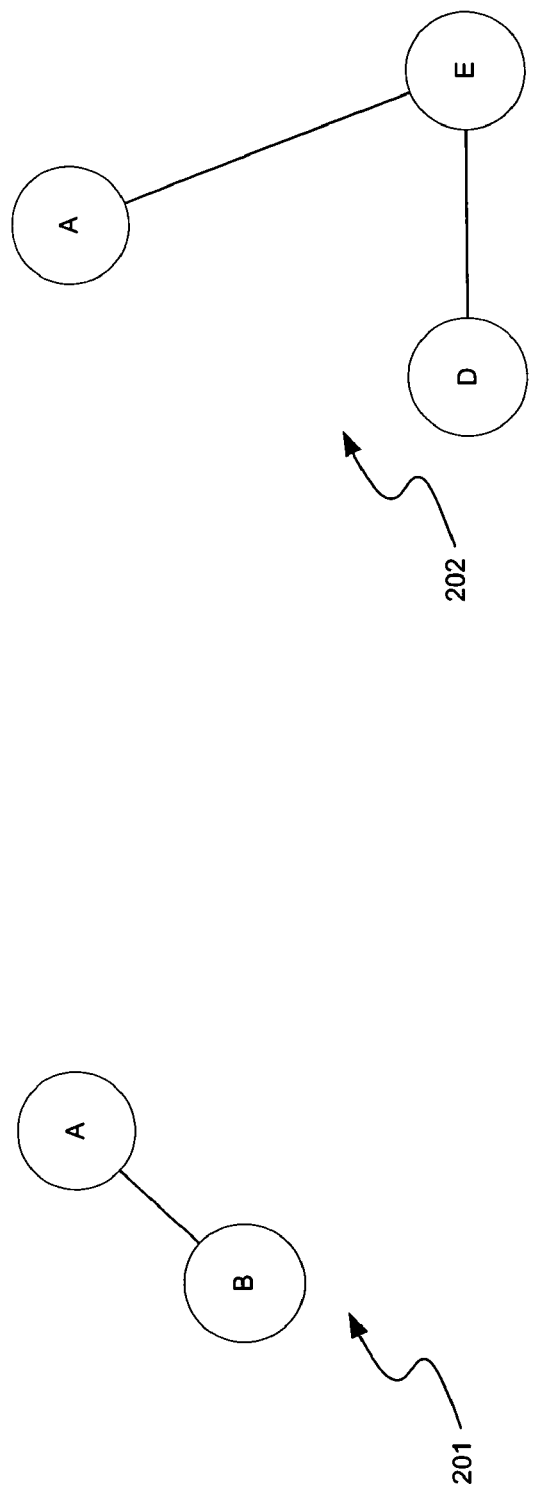
FIG. 2 is a diagram that illustrates the augmentation of a corpus concept graph of FIG. 1.
Figure 2:
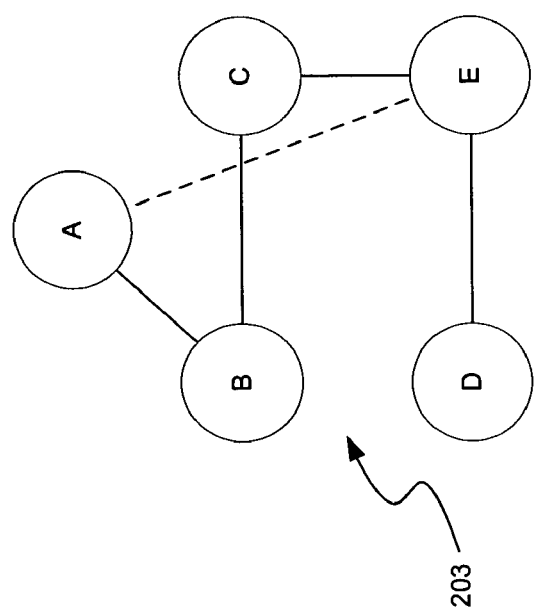
Figure 3:
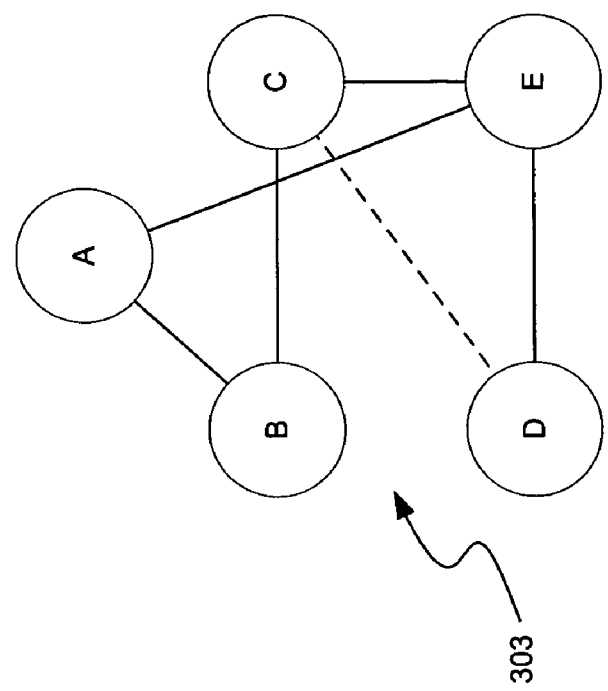
FIG. 3 is a diagram that illustrates the augmentation of a corpus concept graph of FIG. 2.
Figure 3:
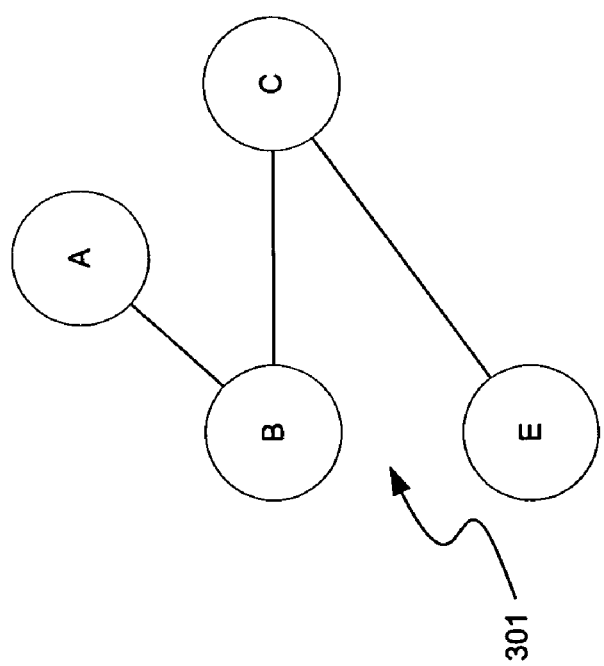

FIGS. 1-3 are diagrams of concept graphs that illustrate the generating of a corpus concept graph in one embodiment. FIG. 1 is a diagram that illustrates the initial creation of a corpus concept graph from document concept graphs. Graphs 101-102 represent document concept graphs, and graph 103 represents a corpus concept graph generated from the document concept graphs. The documents include concepts A, B, C, D, and E that are related. Graph 101 indicates that A is related to B, B is related to C, and C is related to E. Graph 102 indicates that A is related to B and D is related to E. Graph 103 includes all the nodes of graphs 101-102 and represents the relationships between concepts of the corpus containing the documents represented by graphs 101-102. The conceptual distance between A and B is 1, and the conceptual distance between A and D is 4. Although the connection strengths between connected concepts are not shown, the connection strength between A and B would be an aggregate of the connection strengths between A and B of the document concept graphs. If the augmentation system uses a conceptual distance threshold of 2 to indicate a concept gap, then the corpus concept graph indicates a concept gap between A and E, A and D, and B and D because their conceptual distance is greater than 2.

FIG. 2 is a diagram that illustrates the augmentation of a corpus concept graph of FIG. 1. To identify documents that may improve the connectedness between A and D, the augmentation system submits a query based on A and its surrounding concepts (e.g., B) and another query based on D and its surrounding concepts (e.g., E). Graphs 201-202 are document concept graphs of two documents of the query results. Graph 201 indicates that A is related to B, and graph 202 indicates that D is related to E and E is related to A. If the document represented by graph 201 is added to the corpus, it would not improve the conceptual distance between A and D because the corpus document graph 101 already contains the connection between A and B. If the document represented by graph 202 is added to the corpus, it would improve the conceptual distance between A and D because the connection between A and E would result in the conceptual distance between A and D being reduced to 2. The dashed line of graph 203 indicates the updating of the corpus concept graph after the document represented by graph 202 is added to the corpus. Because the document represented by graph 202 also includes a connection between D and E, the augmentation system may update the connection strength between D and E in graph 203. The conceptual distance between B and D is 3 while the conceptual distance between all other pairs of concepts is 1 or 2.

FIG. 3 is a diagram that illustrates the augmentation of a corpus concept graph of FIG. 2. Since B and D are the only pair of concepts with a conceptual distance of greater than 2, the augmentation system generates queries based on B and its surrounding concepts and D and its surrounding concepts. Graph 301 represents a document concept graph of a document in the query result based on B and its surrounding concepts. In this example, the query based on D and its surrounding concepts may have returned only documents that are already in the corpus. The dashed line between C and D in graph 303 represents the updated corpus concept graph after the document represented by graph 301 is added to the corpus. As indicated by graph 303, each pair of concepts has a conceptual distance of 1 or 2. If the augmentation system is unable to locate a document that will reduce the conceptual distance between B and D from 3, then the augmentation system cannot fill in the concept gap between B and D.

Figure 4:
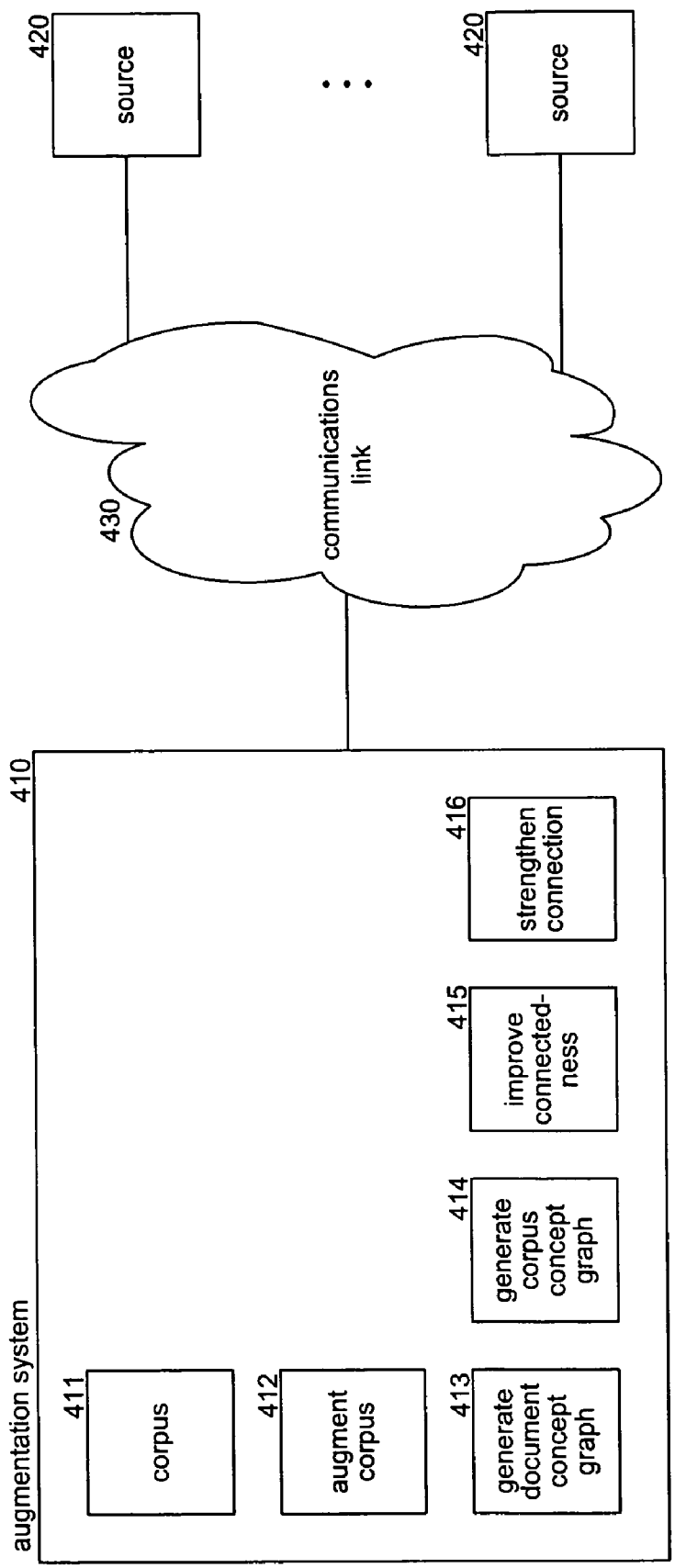
FIG. 4 is a block diagram that illustrates components of the augmentation system in one embodiment.

FIG. 4 is a block diagram that illustrates components of the augmentation system in one embodiment. The augmentation system includes a corpus 411, an augment corpus component 412, a generate document concept graph component 413, a generate corpus concept graph component 414, an improve connectedness component 415, and a strengthen connectedness component 416. The corpus initially contains the documents that are to be analyzed by the augmentation system to determine whether concept gaps need to be filled. The augment corpus component invokes the generate document concept graph component to generate a document concept graph for each document of the corpus. The augment corpus component then invokes a generate corpus concept graph to generate the corpus concept graph for the documents initially in the corpus and to identify any concept gaps (e.g., concepts more than a conceptual distance threshold apart). The augment corpus component invokes the improve connectedness component to augment the corpus with documents to fill the concept gaps. The augment corpus component finally invokes the strengthen connectedness component to augment the corpus with documents to improve the connectedness (e.g., based on connection strength and conceptual distance) of the concepts of the corpus. The strengthen connectedness component may invoke the improve connectedness component. The improve connectedness component may access external sources 420 via a communications link 430, such as the Internet. An external source may provide a search engine service for querying the documents of the external source.

The computing device on which the augmentation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the augmentation system. In addition, the data structures and message structures may be stored or transmitted via a data transmission medium, such as a signal on a communications link. Various communications links may be used, such as the Internet, a local area network, a wide area network, or a point-to-point dial-up connection.

The augmentation system may be implemented in various operating environments. The operating environment described herein is only one example of a suitable operating environment and is not intended to suggest any limitation as to the scope of use or functionality of the augmentation system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The augmentation system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 5:
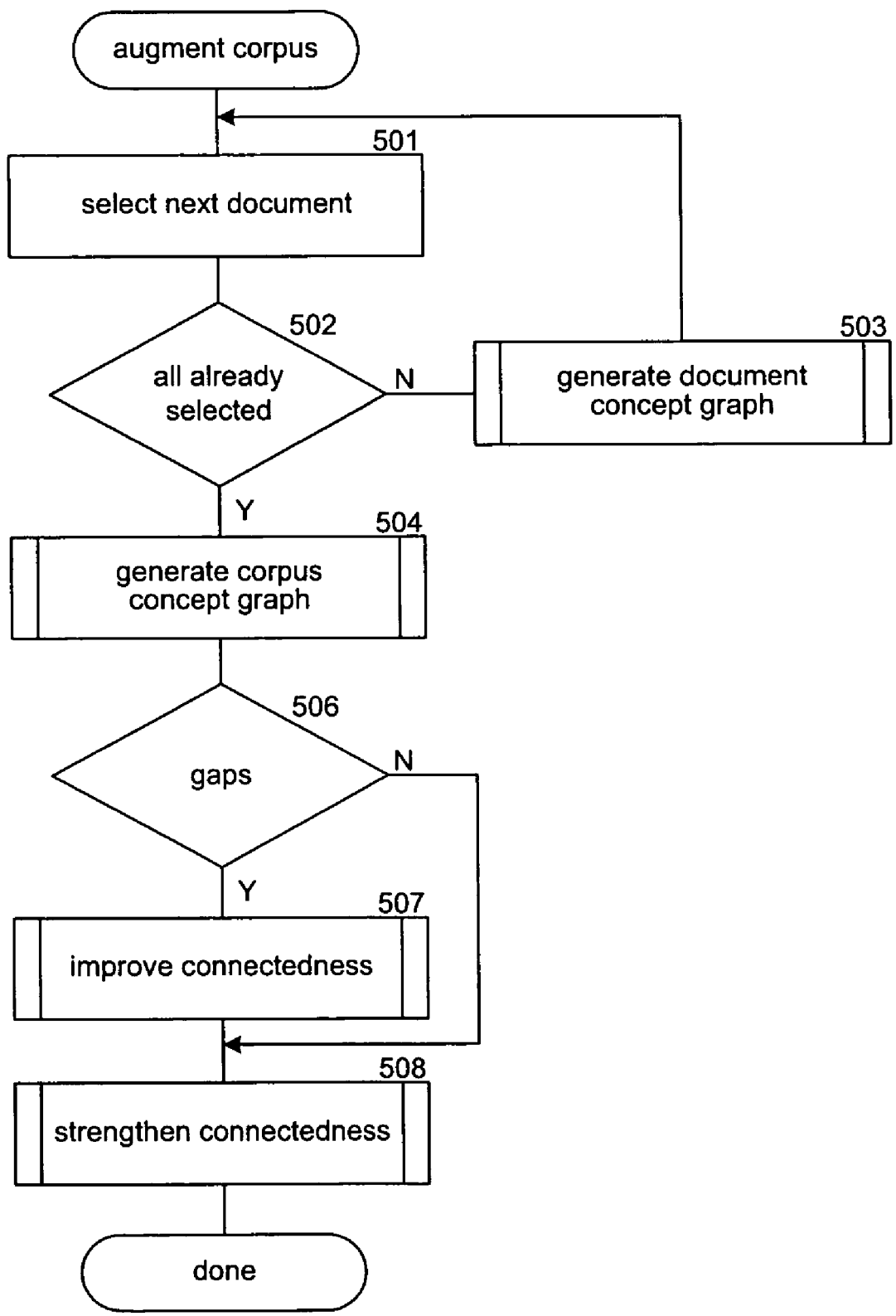
FIG. 5 is a flow diagram that illustrates the processing of the augment corpus component of the augmentation system in one embodiment.

FIG. 5 is a flow diagram that illustrates the processing of the augment corpus component of the augmentation system in one embodiment. The component controls the overall process of augmenting a corpus to fill concept gaps. In blocks 501-503, the component loops generating a document concept graph for each document of the corpus. In block 501, the component selects the next document of the corpus. In decision block 502, if all the documents of the corpus have already been selected, then the component continues at block 504, else the component continues at block 503. In block 503, the component invokes the generate document concept graph component to generate the concept graph for the selected document and then loops to block 501 to select the next document. In block 504, the component invokes the generate corpus concept graph to combine the document concept graphs into a corpus concept graph. In block 506, if the generate corpus concept graph component indicates that the corpus contains concept gaps, then the component continues at block 507, else the component continues at block 508. In block 507, the component invokes the improve connectedness component to identify documents to improve the connectedness of the corpus. In block 508, the component invokes the strengthen connectedness component to identify documents to strengthen the connectedness of the concepts within the corpus. The component then completes.

Figure 6:
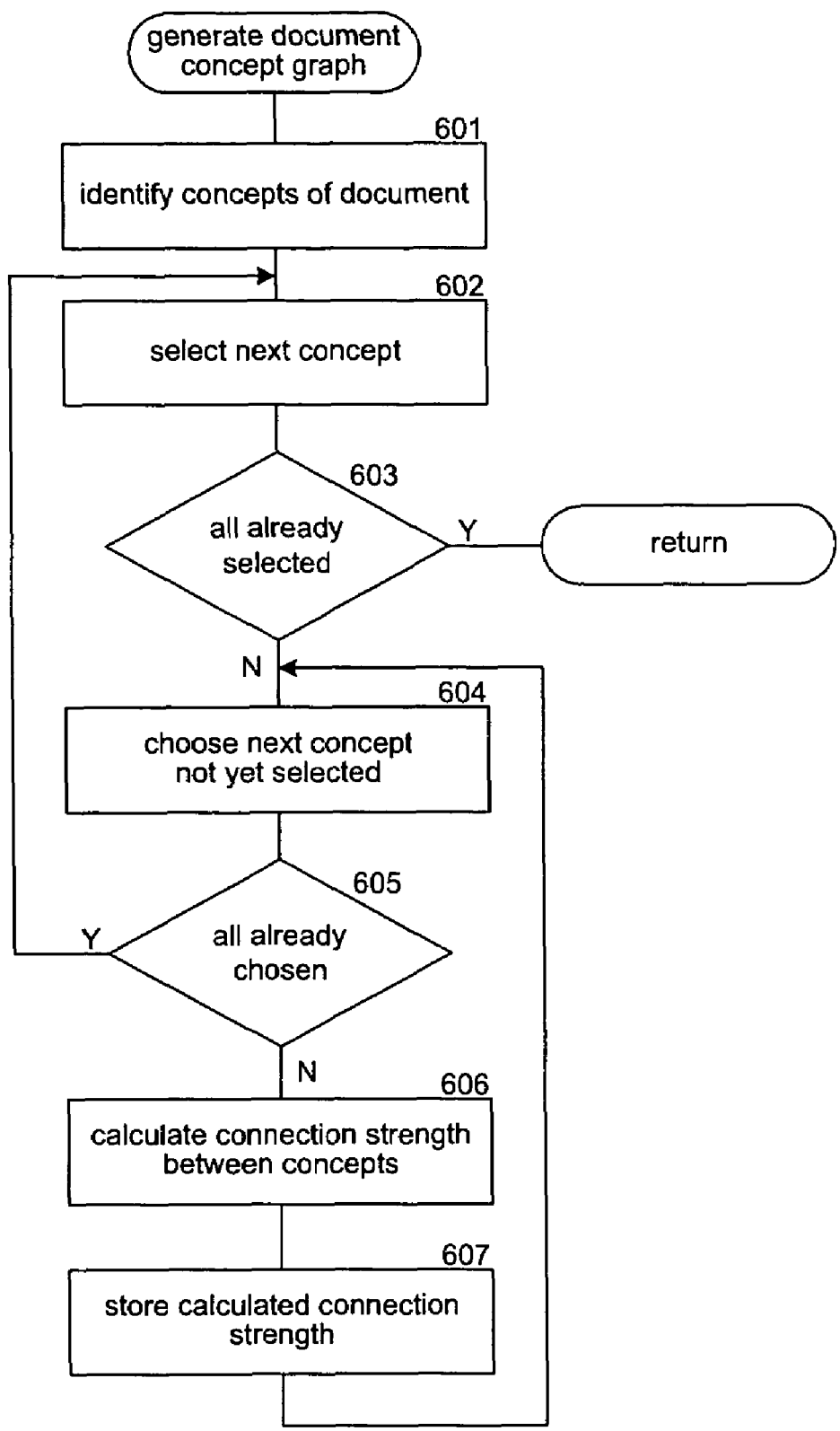
FIG. 6 is a flow diagram that illustrates the processing of the generate document concept graph component of the augmentation system in one embodiment.

FIG. 6 is a flow diagram that illustrates the processing of the generate document concept graph component of the augmentation system in one embodiment. The component is passed a document and generates a document concept graph for that document. In block 601, the component identifies the concepts of the document. In blocks 602-607, the component loops selecting each pair of concepts and calculating the connection strength of their connection, if any. In block 602, the component selects the next concept. In decision block 603, if all the concepts have already been selected, then the component returns, else the component continues at block 604. In block 604, the component chooses the next concept that has not yet been selected. In decision block 605, if all the concepts have already been chosen for the selected concept, then the component loops to block 602 to select the next concept, else the component continues at block 606. In block 606, the component calculates the connection strength between the selected concept and the chosen concept. If the concepts are not related in the document, then the connection strength is set to zero. In block 607, the component stores the calculated connection strength and then moves to block 604 to choose the next concept that has not yet been selected.

Figure 7:
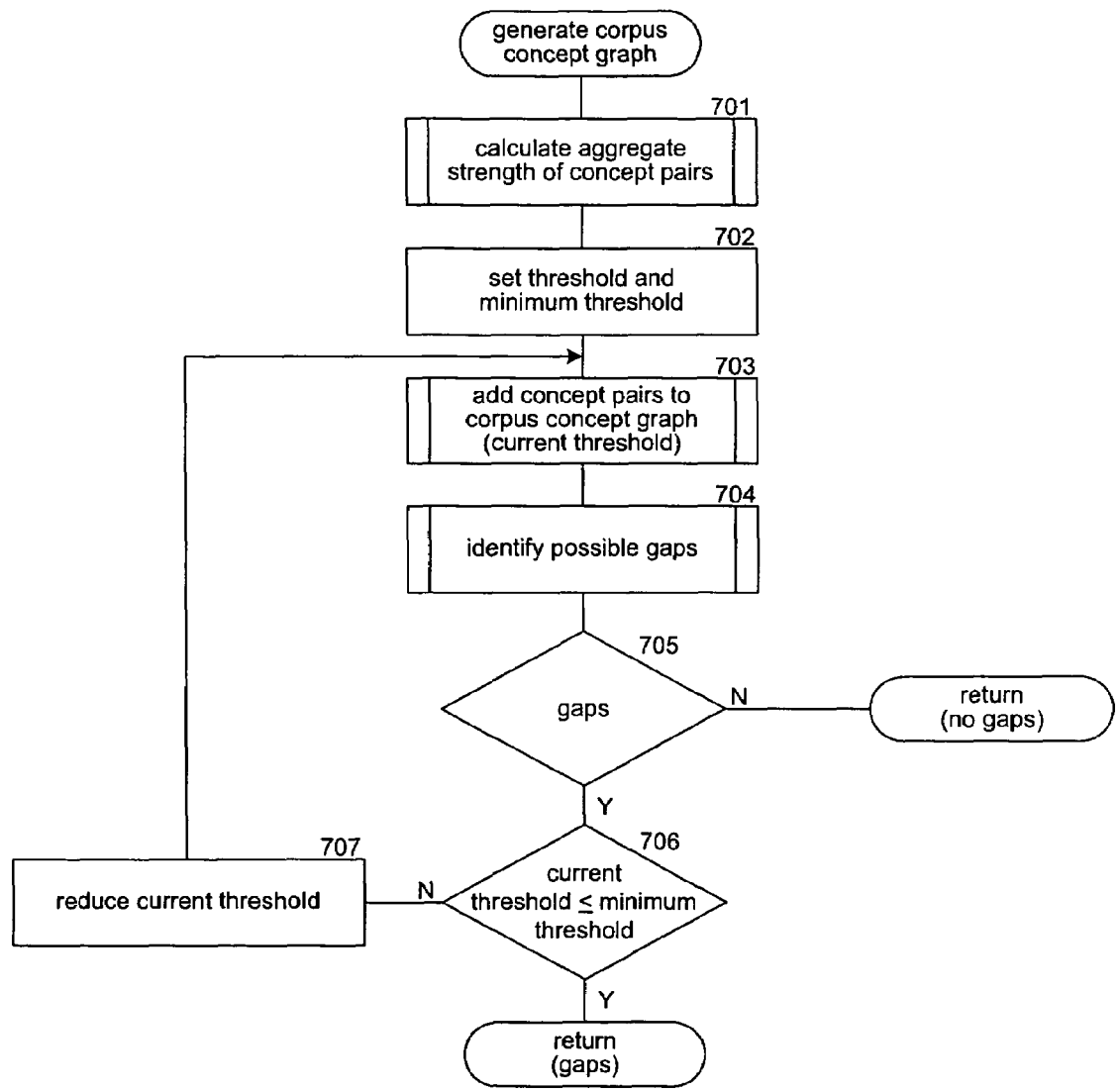
FIG. 7 is a flow diagram that illustrates the processing of the generate corpus concept graph component of the augmentation system in one embodiment.

FIG. 7 is a flow diagram that illustrates the processing of the generate corpus concept graph component of the augmentation system in one embodiment. The component calculates an aggregate connection strength (e.g., average or sum) between pairs of concepts of the document concept graphs and adds those concepts to the corpus concept graph if their connection strength exceeds an initial connection strength threshold. The component may set the initial connection strength threshold based on an upper bound and a lower bound of the connection strengths of the connected concepts in the document concept graphs (i.e., the upper bound represents the strongest connection strength and the lower bond represents the weakest connection found). For example, the component may set the initial connection strength threshold to 70% of the way between the lower bound and the upper bound. After the component generates the initial corpus concept graph, it attempts to add additional concept pairs whose connection strength is lower in order to fill concept gaps identified based on conceptual distance. The component may only add concepts with lower connection strength when the adding of the concepts would help fill in a concept gap. The component may incrementally lower the connection strength threshold until all the concept gaps have been filled or until the connection strength threshold reaches a minimum connection strength threshold, which is between the upper- and lower-bound connection strength and may be configurable. For example, the component may set the minimum connection strength threshold to 50% of the way between the lower and the upper bound. In block 701, the component invokes the calculate aggregate connection strength of concept pairs to calculate the aggregate connection strength between each pair of connected concepts. In block 702, the component sets the initial connection strength threshold and the minimum connection strength threshold. In blocks 703-707, the component loops successively lowering the connection strength threshold attempting to fill in concept gaps with pairs of concepts with lower connection strengths. In block 703, the component invokes the add concept pairs to the corpus concept graph component to add nodes to the corpus concept graph whose connection strength is greater than the current connection strength threshold. After the initial corpus concept graph is created, the invoked component may only add connections between concept pairs when the connection would help to fill in a concept gap. In block 704, the component invokes the identify possible gaps component to identify concept gaps. In decision block 705, if a gap is identified, then the component continues at block 706, else the component returns an indication that there are no gaps in the corpus concept graph. In decision block 706, if the current connection strength threshold is less than the minimum connection strength threshold, then the component returns an indication that there are gaps in the corpus concept graph, else the component continues at block 707. In block 707, the component lowers the current connection strength threshold to help fill in the concept gaps. The component may lower the connection strength threshold by a fixed amount or by a variable amount based on analysis of the connection strengths for concepts that have not yet been added to the corpus concept graph. The component then loops to block 703 to help fill in the concept gaps.

Figure 8:
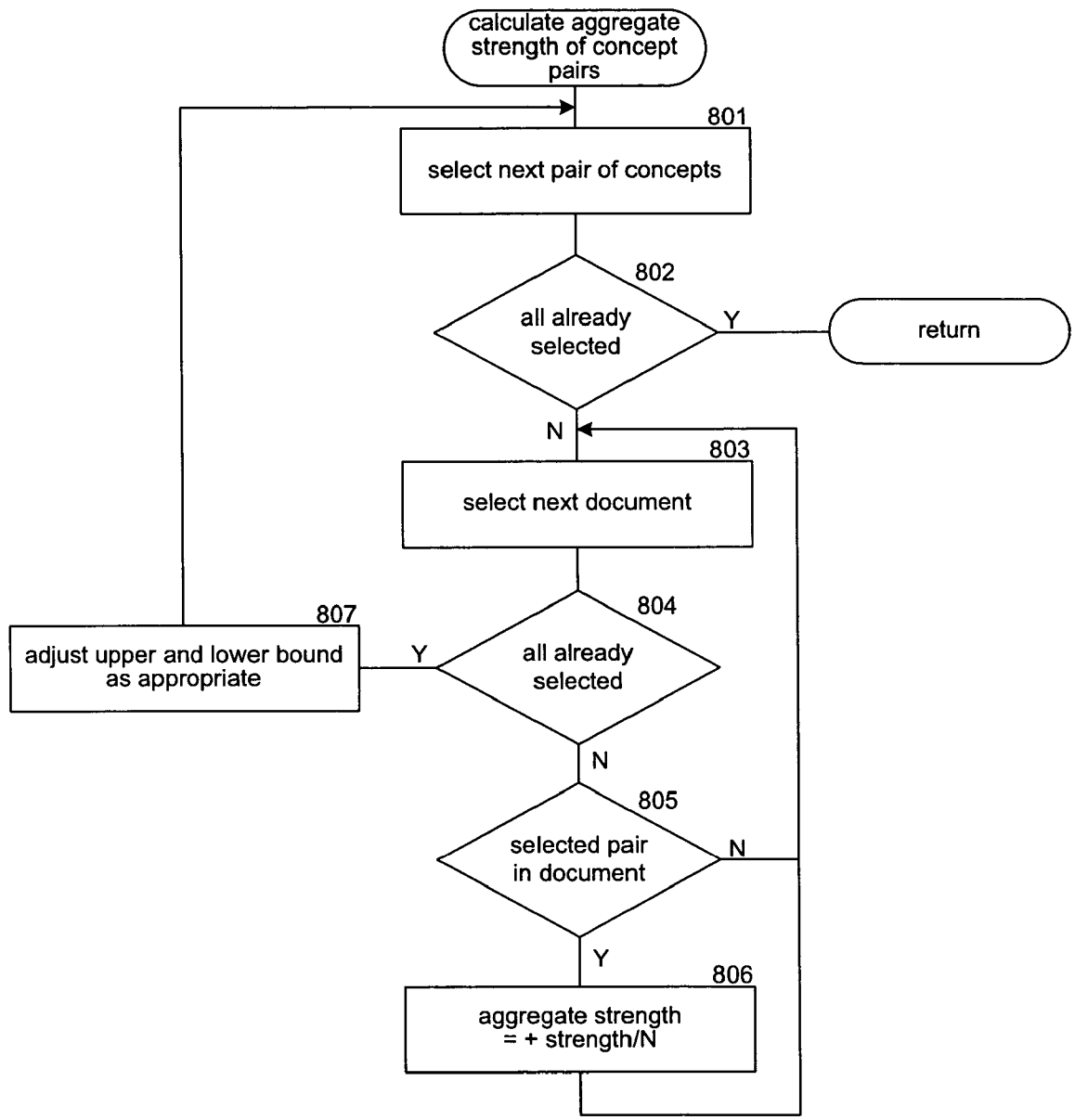
FIG. 8 is a flow diagram that illustrates the processing of the calculate aggregate strength of concept pairs component of the augmentation system in one embodiment.

FIG. 8 is a flow diagram that illustrates the processing of the calculate aggregate strength of concept pairs component of the augmentation system in one embodiment. The component selects each pair of connected concepts as indicated by the document concept graphs and calculates an aggregate connection strength. In block 801, the component selects the next pair of concepts. In decision block 802, if all the pairs of concepts have already been selected, then the component returns, else the component continues at block 803. In blocks 803-806, the component loops aggregating the connection strengths of the selected pair from each document concept graph. In block 803, the component selects the next document. In decision block 804, if all the documents have already been selected, then the component continues at block 807, else the component continues at block 805. In decision block 805, if the selected pair is in the selected document, then the component continues at block 806, else the selected document increases the aggregate connection strength of the selected pair of concepts and the component loops to block 803 to select the next document. In block 806, the component adds the connection strength of the selected pair from the selected document divided by the number of documents to the aggregate connection strength for the selected pair and then loops to block 803 to select the next document. In block 807, the component adjusts the upper bound of the connection strength if the aggregate connection strength for the selected pair is greater than the previous highest aggregate connection strength and adjusts the lower bound of the connection strength if the aggregate connection strength for the selected pair is less than the previous lowest aggregate connection strength. The component then loops to block 801 to select the next pair of concepts.

Figure 9:
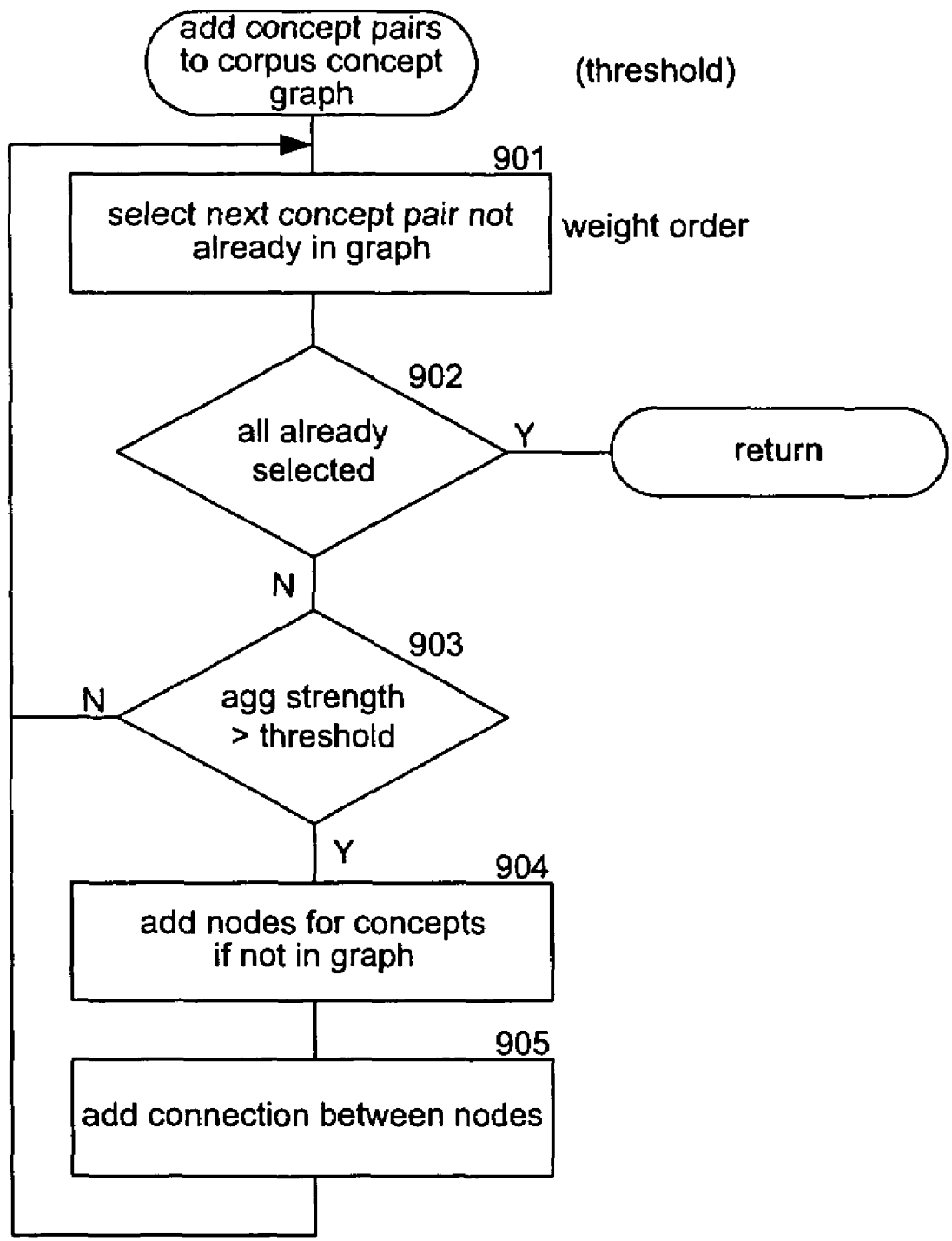
FIG. 9 is a flow diagram that illustrates the processing of the add concept pairs to the corpus concept graph component in one embodiment.

FIG. 9 is a flow diagram that illustrates the processing of the add concept pairs to the corpus concept graph component in one embodiment. The component is passed a connection strength threshold and adds concept pairs whose aggregate connection strength is greater than the connection strength threshold to the corpus concept graph. When the corpus concept graph is initially generated, the component adds concept pairs whose aggregate connection strength is greater than the connection strength threshold to the corpus concept graph. When the corpus concept graph is having its concept gaps filled in, the component only adds concept pairs that will help fill in a gap and whose aggregate connection strength is greater than the connection strength threshold. In block 901, the component selects the next concept pair not already in the graph. In decision block 902, if all the concept pairs have already been selected, then the component returns, else the component continues at block 903. In decision block 903, if the aggregate connection strength of the selected concept pair is greater than the connection strength threshold, then the component continues at block 904, else the component loops to block 901 to select the next concept pair. In block 904, the component adds nodes for the selected concept pair if not already in the graph and if the nodes would help fill in a gap after the initial corpus concept graph is created. In block 905, the component adds a connection between the nodes of the concepts and then loops to block 901 to select the next concept pair.

Figure 10:
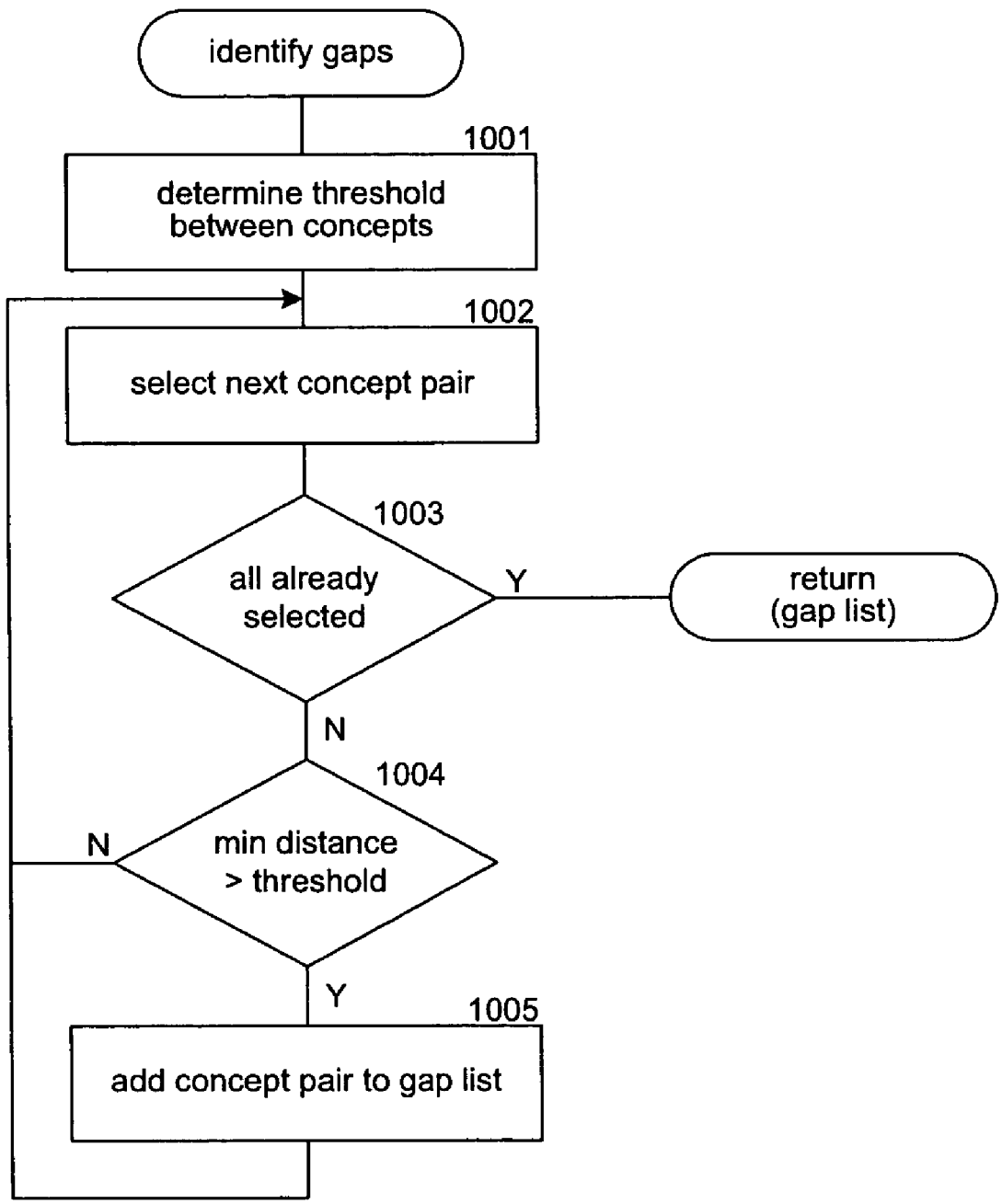
FIG. 10 is a flow diagram that illustrates the processing of the identify gaps component of the augmentation system in one embodiment.

FIG. 10 is a flow diagram that illustrates the processing of the identify gaps component of the augmentation system in one embodiment. The component identifies gaps in a corpus concept graph. A gap between a pair of concepts may occur when their conceptual distance is greater than a conceptual distance threshold. Alternatively, the definition of a gap may also factor in connection strength. In block 1001, the component establishes the conceptual distance threshold between a pair of concepts that indicates no gap. In blocks 1002-1005, the component loops selecting concept pairs and determining whether there is a conceptual gap between them. In block 1002, the component selects the next concept pair. In decision block 1003, if all the concept pairs have already been selected, then the component returns a list of the conceptual gaps, else the component continues at block 1004. In decision block 1004, if the minimum conceptual distance between the concepts of the selected pair is greater than the conceptual distance threshold, then there is a gap between the concepts and the component continues at block 1005, else the component loops to block 1002 to select the next pair of concepts. In block 1005, the component adds the selected concept pair to the list of gaps and then loops to block 1002 to select the next concept pair. To determine the minimum conceptual distance between the concepts, the component may need to traverse all paths in the corpus concept graph between the concepts.

Figure 11:
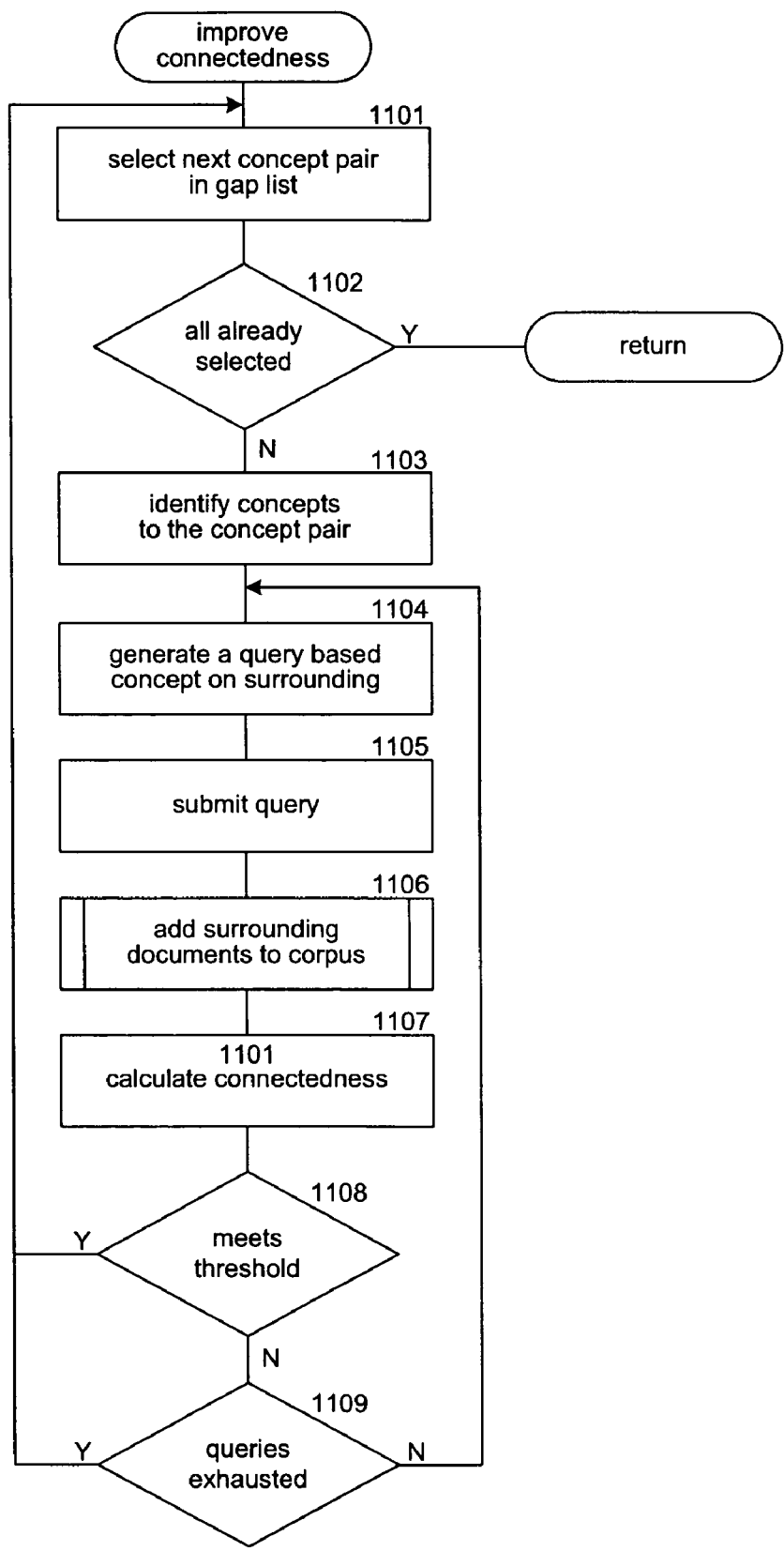
FIG. 11 is a flow diagram that illustrates the processing of the improve connectedness component of the augmentation system in one embodiment.

FIG. 11 is a flow diagram that illustrates the processing of the improve connectedness component of the augmentation system in one embodiment. The component attempts to improve connectedness (e.g., reduce conceptual distances and/or increase connection strengths) of a corpus by searching for and adding documents to the corpus if it would improve connectedness. The component may be passed the type of connectedness to be improved. For example, when filling in conceptual gaps, the component tries to improve conceptual distance, and when strengthening connections, the component tries to improve overall connectedness. In block 1101, the component selects the next concept pair for which there is a concept. In decision block 1102, if all such concept pairs have already been selected, then the component returns, else the component continues at block 1103. In block 1103, the component identifies surrounding concepts to each concept of the concept pair. In blocks 1104-1109, the component loops generating queries based on various combinations of the concept and surrounding concepts, identifying documents that satisfy the queries, and adding the documents to the corpus when they would help improve the connectedness between the selected concept pair. In block 1104, the component generates a query based on a concept of the selected pair and its surrounding concepts. In block 1105, the component submits the query to a search engine service, which returns documents as its result. In block 1106, the component invokes an add documents to corpus component to add the documents to the corpus if it would improve the connectedness. In block 1107, the component calculates the connectedness between the selected pair of concepts. In decision block 1108, if the connectedness satisfies a threshold, then the concepts are sufficiently connected and the component loops to block 1101 to select the next concept pair, else the component continues at block 1109. In decision block 1109, if all possible queries have already been submitted, then the component loops to block 1101 to select the next concept, else the component loops to block 1104 to submit the next query.

Figure 12:
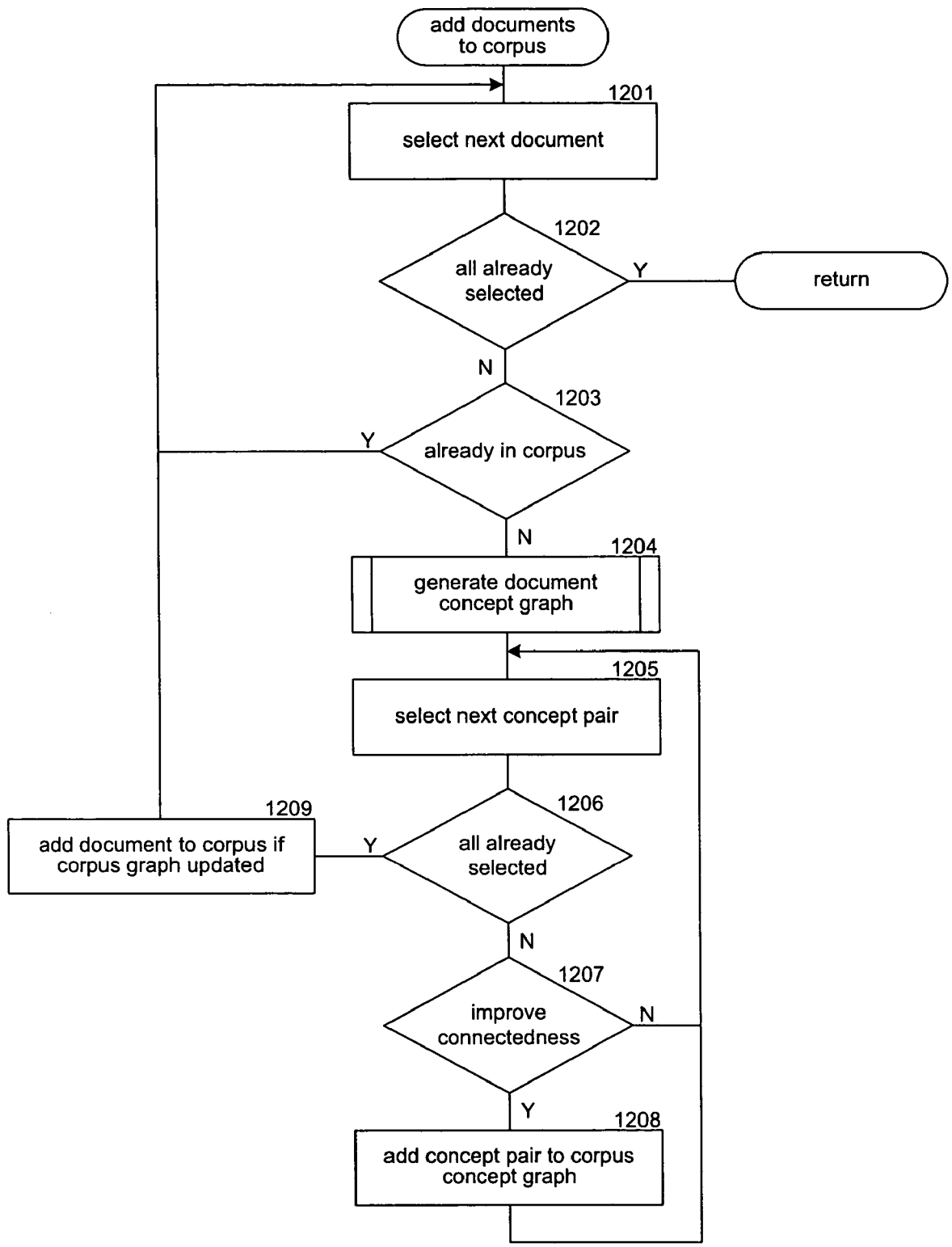
FIG. 12 is a flow diagram that illustrates the processing of the add documents to corpus component in one embodiment.

FIG. 12 is a flow diagram that illustrates the processing of the add documents to corpus component in one embodiment. The component is passed a concept pair and documents and adds the documents to the corpus that would improve the connectedness (e.g., based on conceptual distance or connection strength) of the concept pair. In block 1201, the component selects the next document. In decision block 1202, if all the documents have already been selected, then the component returns, else the component continues at block 1203. In decision block 1203, if the selected document is already in the corpus, then the component loops to block 1201 to select the next document, else the component continues at block 1204. In block 1204, the component invokes a generate document concept graph component to generate a document concept graph for the selected document. In blocks 1205-1208, the component loops selecting the concept pairs of the selected document as indicated by the document concept graph and adds the concept pairs to the corpus concept graph if it would improve the connectedness of the passed concept pair. In block 1205, the component selects the next concept pair of the selected document. In decision block 1206, if all the concept pairs have already been selected, then the component continues at block 1209, else the component continues at block 1207. In decision block 1207, if adding the selected concept pair would improve the connectedness between the passed concept pair, then the component continues at block 1208, else the component loops to block 1205 to select the next concept pair of the selected document. In block 1208, the component adds the selected concept pair to the corpus concept graph and then loops to block 1205 to select the next concept pair. In block 1209, the component adds the selected document to the corpus if a concept pair of the selected document was added to the corpus concept graph and then loops to block 1201 to select the next document.

Figure 13:
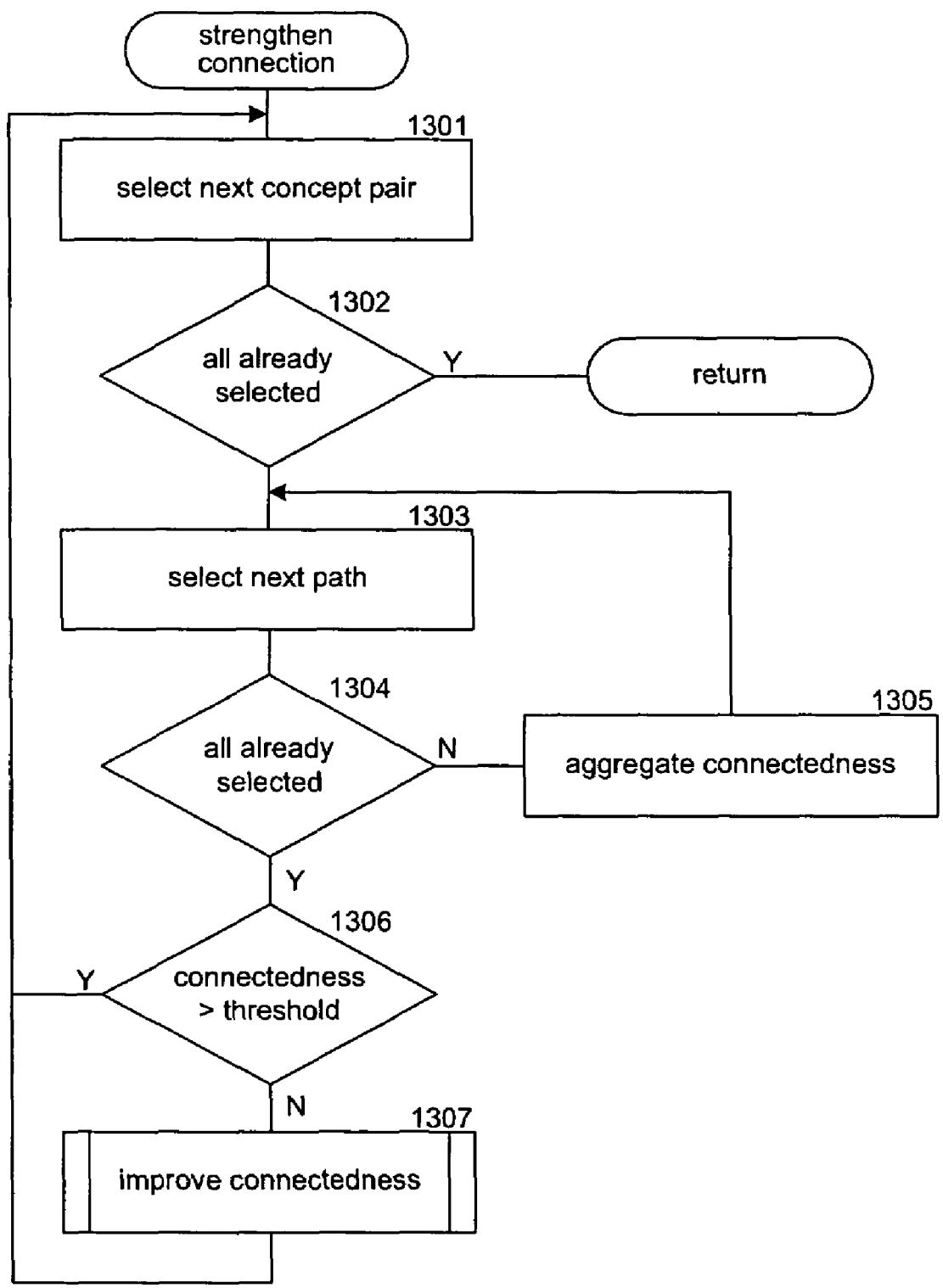
FIG. 13 is a flow diagram that illustrates the processing of the strengthen connections component of the augmentation system in one embodiment.

FIG. 13 is a flow diagram that illustrates the processing of the strengthen connections component of the augmentation system in one embodiment. The component is passed a corpus concept graph and identifies concept pairs whose connectedness may be less than a connectedness threshold that is based both on the distance of paths between the concepts and the connection strength of the connections of those paths. In block 1301, the component selects the next concept pair of the corpus concept graph. In decision block 1302, if all the concept pairs have already been selected, then the component returns, else the component continues at block 1303. In blocks 1303-1307, the component loops selecting each path between the concept pair, calculating an aggregate connectedness of the concept pair, and improving the connectedness of the concept pair. In block 1303, the component selects the next path between the concept pair. In decision block 1304, if all the paths have already been selected, then the component continues at block 1306, else the component continues at block 1305. In block 1305, the component aggregates the connectedness based on the paths selected so far. In decision block 1306, if the aggregate connectedness is greater than a connectedness threshold, then the concept pair is sufficiently connected and the component loops to block 1301 to select the next concept pair, else the component continues about 1307. In block 1307, the component invokes the improve connectedness component to improve the connectedness of the selected concept pair and then loops to block 1301 to select the next concept pair.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

From the foregoing, it will be appreciated that specific embodiments of the invention have been described herein for purposes of illustration, but that various modifications may be made without deviating from the spirit and scope of the invention. The techniques of augmentation system may be performed manually. In addition, some of the techniques may be automated and others performed manually in various combinations. For example, a person using techniques of the augmentation system may manually identify gaps in a collection and/or may manually identify documents that can be used to augment the knowledge base. In addition, the searching of an augmented collection may be performed manually. The techniques of the augmentation system may be performed manually. Accordingly, the invention is not limited except as by the appended claims.

We claim:

1. A method in a computing system with a processor for augmenting a corpus of documents, the method comprising:
    generating a corpus concept graph from the documents indicating connections between concepts of the documents of the corpus;
    analyzing the corpus concept graph to determine whether connectedness of concepts of the documents of the corpus is sufficient; and
    when the analysis indicates that the connectedness of some concepts is not sufficient, adding to the corpus documents relating to the concepts that do not have sufficient connectedness
    wherein the generating, analyzing, and adding are performed by the processor.

2. The method of claim 1 wherein the generating of a corpus concept graph includes generating document concept graphs for the documents of the corpus indicating connections between concepts within a document and wherein the corpus concept graph is created from the document concept graphs.

3. The method of claim 2 wherein the generating of a document concept graph includes identifying concepts of the document and indicating strength of the connections between the concepts of the document.

4. The method of claim 3 wherein the identifying of concepts of a document includes identifying keywords of the documents.

5. The method of claim 3 wherein the connection strength of concepts is based on the distance between locations of the concepts within the document.

6. The method of claim 1 wherein the generating of the corpus concept graph includes adding to the corpus concept graph connections between concepts when the connection strength of concepts of the documents satisfies a document connection strength threshold.

7. The method of claim 1 wherein the analyzing of the corpus concept graph includes determining the conceptual distance between concepts of the corpus concept graph.

8. The method of claim 7 wherein the conceptual distance between concepts is based on the number of concepts between the concepts.

9. The method of claim 7 wherein the connectedness of concepts is not sufficient when the conceptual distance between the concepts does not satisfy a conceptual distance threshold.

10. The method of claim 1 wherein the adding to the corpus documents relating to the concepts that do not have sufficient connectedness includes generating queries based on the concepts, identifying documents that satisfy the queries, and adding an identified document to the corpus that would improve connectedness of the concepts.

11. The method of claim 1 wherein the analyzing of the corpus concept graph to determine whether connectedness of concepts of the documents of the corpus is sufficient is based only on conceptual distance and further includes analyzing the corpus concept graph to identify concepts whose connectedness, based on both conceptual distance and connection strength, does not satisfy a corpus connectedness threshold; and when the analysis indicates that the connectedness of some concepts does not satisfy the corpus connectedness threshold, adding to the corpus documents relating to the concepts that do not satisfy the corpus connectedness threshold.

12. The method of claim 1 wherein the connectedness is based only on conceptual distance and after adding to the corpus documents relating to the concepts that do not have sufficient conceptual distance, adding to the corpus documents relating to concepts that do not have sufficient connectedness based on both conceptual distance and connection strength.

13. A method in a computing device with a processor for identifying gaps in a knowledge base, the method comprising:
 generating a concept graph representing concepts of the knowledge base that connects concepts that are related as indicated by the knowledge base;
 analyzing the concept graph to determine whether connectedness between the concepts of the knowledge base is sufficient; and
 indicating the concepts whose connectedness in the knowledge base is not sufficient
 wherein the generating, analyzing, and indicating are performed by the processor.

14. The method of claim 13 wherein the knowledge base is generated from a person.

15. The method of claim 14 wherein the knowledge base is a document created by the person.

16. The method of claim 14 wherein the knowledge base is generated by the person answering questions.

17. The method of claim 14 wherein the indicating includes identifying documents relating to the concepts whose connectedness in the knowledge base is not sufficient and suggesting that the person read the identified documents.

18. The method of claim 13 wherein the knowledge base is a corpus of documents.

19. The method of claim 18 wherein the concept graph is generated from document concept graphs.

20. The method of claim 19 wherein the concept graph includes concepts of the document concept graphs with connections of the document concept graphs that satisfy a connection strength threshold.

21. The method of claim 20 wherein the connectedness is based only on the conceptual distance between concepts.

22. The method of claim 20 wherein the connectedness is based on both the conceptual distance and connection strength of concepts.

23. A method in a computing system with a processor for determining connectedness of concepts within a corpus of documents, the method comprising:
 generating document concept graphs for the documents of the corpus indicating connections and strength of connections between concepts within a document; and
 generating a corpus concept graph from the document concept graphs indicating connections and an aggregate strength of connections between concepts of the documents of the corpus
 wherein the connectedness of the concepts of the corpus is based on the aggregate strength of connections between concepts and wherein the generating of the document concept graphs and the corpus concept graph are performed by the processor.

24. The method of claim 23 wherein the connectedness is further based on the conceptual distance between concepts of the corpus.

25. The method of claim 23 wherein the documents represent a knowledge base derived from one person.

26. The method of claim 23 wherein when the connectedness of concepts does not satisfy a connectedness threshold, indicating a gap in the connectedness of the concepts of the corpus.

27. A method in a computing system with a processor for generating a query, the method comprising:
 providing a corpus concept graph indicating connections and strength of connections between concepts represented by the corpus concept graph;
 receiving a query having an input concept;
 identifying from the corpus concept graph a concept that is related to the input concept based on the connections and strength of the connections; and
 augmenting the query with the identified concept
 wherein the providing, receiving, identifying, and augmenting are performed by the processor.

28. The method of claim 27 including submitting the augmented query to a search engine to identify items related to the received query.

29. The method of claim 27 wherein the identifying of a concept is also based on the conceptual distance of the concept from the input concept.

30. The method of claim 27 wherein the corpus concept graph is generated from document concept graphs of documents of the corpus.

31. A computing device with a processor and memory for augmenting a corpus of documents, comprising:
 a corpus store containing the corpus of documents;
 a component having computer-executable instructions that generate a corpus concept graph from the documents of the corpus, the corpus concept graph indicating connections between concepts of the documents of the corpus;
 a component having computer-executable instructions that determine whether connectedness of concepts of the documents of the corpus is sufficient based on analysis of the connections between concepts of the documents of the corpus as indicated by the corpus concept graph; and
 a component having computer-executable instructions that, when it is determined that the connectedness of some concepts is not sufficient, adds to the corpus documents relating to the concepts that do not have sufficient connectedness
 wherein the computer-executable instructions of the component are stored in the memory for execution by the processor.

32. The computing device of claim 31 wherein the instructions that generate a corpus concept graph include instructions that generate document concept graphs for the documents of the corpus indicating connections between concepts within a document by identifying concepts of the document and indicating strength of the connections between the concepts of the document and wherein the corpus concept graph is created from the document concept graphs.

33. The computing device of claim 32 wherein the connection strength of concepts is based on the distance between locations of the concepts within the document.

34. The computing device of claim 32 wherein the instructions that add to the corpus documents relating to the concepts that do not have sufficient connectedness include instructions that generate queries based on the concepts, identify documents that satisfy the queries, and add an identified document to the corpus that would improve connectedness of the concepts.

35. A computer-readable storage medium containing computer-executable instructions for identifying gaps in a knowledge base, by a method comprising:
  generating a concept graph representing concepts of the knowledge base that connects concepts that are related as indicated by the knowledge base;
  determining whether connectedness between the concepts of the knowledge base is sufficient to adequately represent the concepts of the knowledge base; and
  indicating the concepts whose connectedness in the knowledge base is not sufficient and thereby identifying gaps in the knowledge base
  wherein the instructions are executable by a processor of a computer.

36. The computer-readable storage medium of claim 35 wherein the indicating includes identifying documents relating to the concepts whose connectedness in the knowledge base is not sufficient and suggesting that the person read the identified documents.

37. The computer-readable storage medium of claim 35 wherein the knowledge base is a corpus of documents, the concept graph is generated from document concept graphs and includes concepts of the document concept graphs with connections of the document concept graphs that satisfy a connection strength threshold, and the connectedness is based on the conceptual distance and connection strength of concepts.

* * * * *

UNITED STATES PATENT AND TRADEMARK OFFICE
CERTIFICATE OF CORRECTION

PATENT NO. : 7,555,472 B2
APPLICATION NO. : 11/218667
DATED : June 30, 2009
INVENTOR(S) : Alan Craig et al.

It is certified that error appears in the above-identified patent and that said Letters Patent is hereby corrected as shown below:

On page 2, column 2, under "Other Publications", line 12, delete "Huang-Chenh" and insert -- Huang-Cheng --, therefor.

On page 2, column 2, under "Other Publications", line 17, delete "Conferene" and insert -- Conference --, therefor.

On page 2, column 2, under "Other Publications", line 18, delete "Identifer" and insert -- Identifier --, therefor.

Signed and Sealed this

First Day of September, 2009

David J. Kappos
*Director of the United States Patent and Trademark Office*